Dec. 17, 1968 A. COLE 3,416,827
PORTABLE LOCK FOR MOTOR VEHICLE DOORS AND WINDOWS
Filed Feb. 20, 1967 3 Sheets-Sheet 1
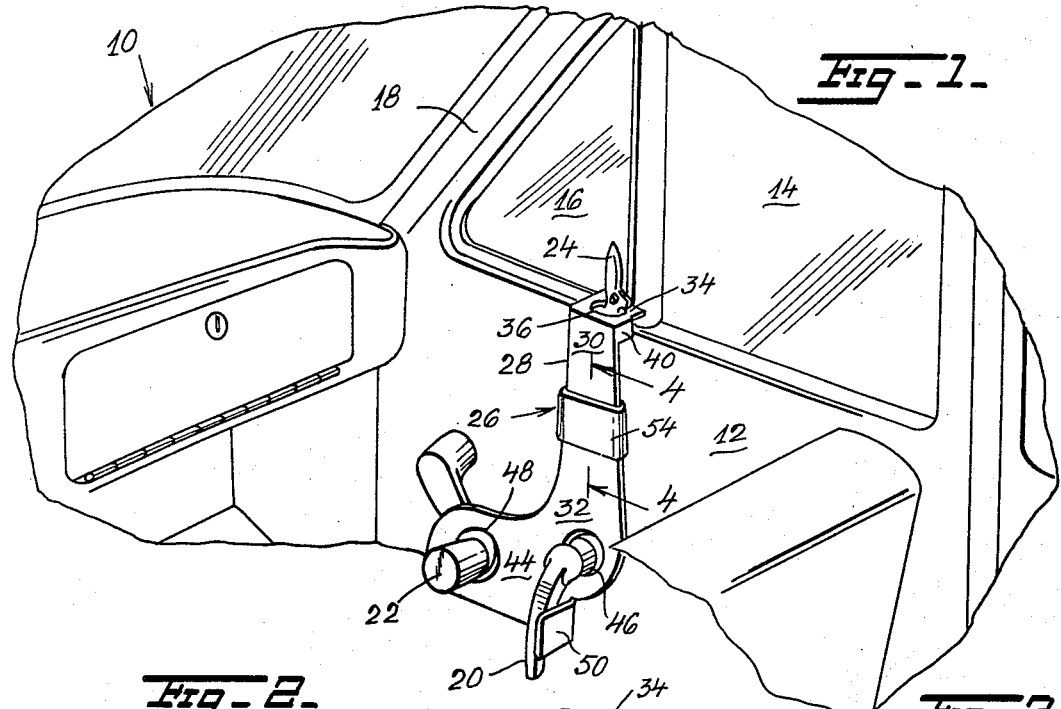
INVENTOR
Alan Cole
BY
Polachek & Saulsbury
ATTORNEYS

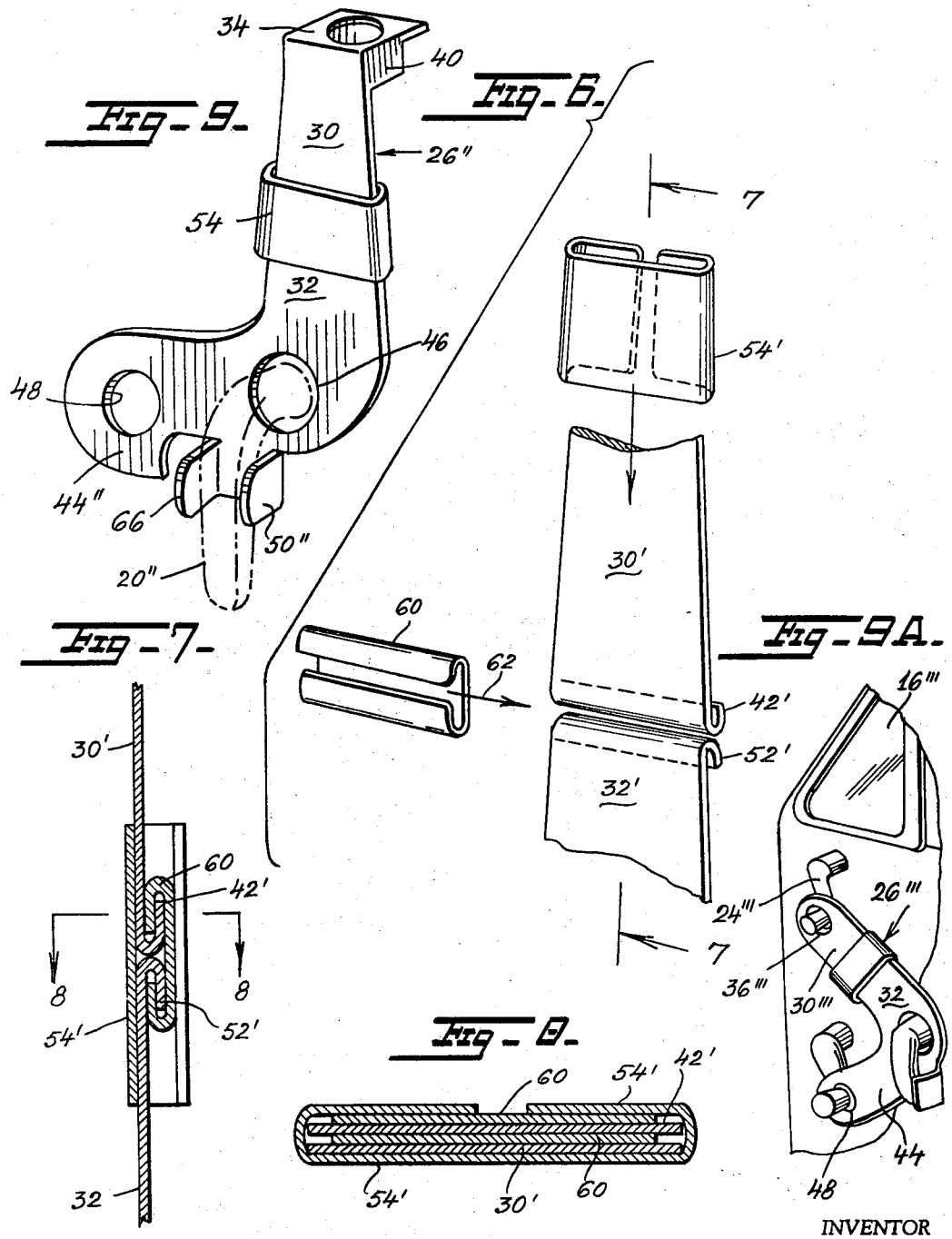

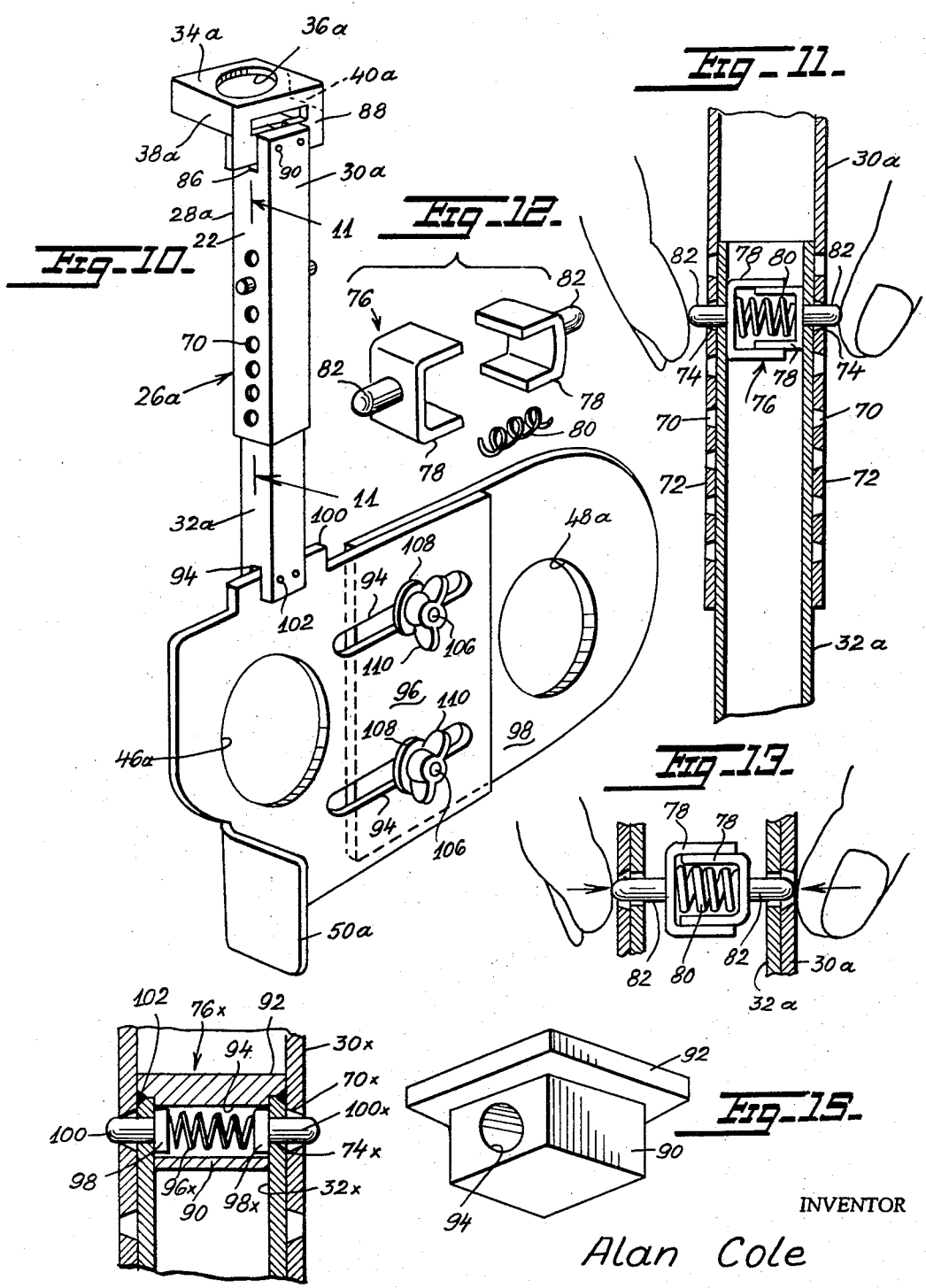

United States Patent Office 3,416,827
Patented Dec. 17, 1968

3,416,827
PORTABLE LOCK FOR MOTOR VEHICLE DOORS AND WINDOWS
Alan Cole, 3100 Brighton 3rd St., Brooklyn, N.Y. 11235
Filed Feb. 20, 1967, Ser. No. 617,390
10 Claims. (Cl. 292—288)

ABSTRACT OF THE DISCLOSURE

An attachment for the doors and windows of an automobile to lock the doors and windows and prevent theft of contents inside locked automobiles and unauthorized driving or unauthorized towing away of the automobile. An elongated sectional plate is provided, one section bent to interlock with the handle that manipulates the pivotal window, and the other section is bent to interlock with the handle that manipulates the door of the automobile and the handle that raises and lowers the window.

Brief summary of the invention

A portable lock for the doors and windows of an automobile including an elongated section metal plate shaped at one end to fit over the handle that manipulates the pivotal window of the automobile and shaped at its other end with holes for fitting over the handle that manipulates the door of an automobile. The other end has a radial lug engaging the door handle to prevent turning thereof. The sections are hooked to each other at their meeting ends and a sleeve or bands holds the hooked ends from separating. The lock is built separately for right and left doors, for rear doors and for any configuration of door handle, or revolving window handle, and for no-draft window handles.

An important object of the invention is to provide a locking device designed for use in locking the pivoted ventilating window and the sliding windows of an automobile as well as the door of the automobile against opening by unauthorized persons.

Brief description of the views of the drawings

FIGURE 1 is a perspective view of the door and the windows thereabove on one side of an automobile, a locking device embodying the invention being shown in operative position.

FIG. 2 is an enlarged rear perspective view of the locking device.

FIG. 3 is a front perspective view of the joint between the sections of the body of the locking device, the joint being shown separated.

FIG. 4 is enlarged vertical sectional view taken on the plane of the line 4—4 of FIG. 1.

FIG. 5 is a front elevation view of the locking device partly formed.

FIG. 6 is a disassembled front perspective view of a modified form of joint between the body sections.

FIG. 7 is a vertical sectional view along the lines 7—7 of FIG. 6 showing the joint assembled.

FIG. 8 is a cross-sectional view of the joint taken on the plane of the line 8—8 of FIG. 7 on a larger scale.

FIG. 9 is a front perspective view of a locking device embodying another modified form of the invention, a door handle being shown in dash lines.

FIG. 9A is a fragmentary perspective view similar to FIG. 1 showing yet another modified form of locking device.

FIG. 10 is a front perspective view of a locking device embodying still another modified form of the invention.

FIG. 11 is an enlarged vertical section view taken on the plane of the line 11—11 of FIG. 10, the operator's fingers being shown preparatory to pressing the buttons for breaking the connection between the sections of the body.

FIG. 12 is a disassembled view of the spring pressed latching members.

FIG. 13 is a view similar to FIG. 11 but showing the connection between the body sections in released condition.

FIG. 14 is a vertical sectional through yet another modified form of connection between the body sections.

FIG. 15 is a front perspective view of yet a further connector device for the body sections.

Detailed description of the drawings

Referring now in detail to the various views of the drawings, in FIG. 1, there is shown a conventional automobile 10 which includes the usual side doors 12, sliding windows 14 at the top of the door, and an air ventilating window 16 pivotally mounted on the frame 18 of the automobile, alongside the door window 14. The door is provided with the usual inner handle 20, the window 14 with the usual inner handle 22, and the pivotal window 16 with the usual inner handle 24 projecting upwardly from the sill of the window 16.

In accordance with the present invention, an attachment in the form of a removable and portable locking device 26 is interlocked with the various handles on the inside of the automobile to prevent manipulation of such handles. The locking device 26 comprises an elongated sectional tapered body 28 of metal composed of two sections, i.e. section 30 and section 32.

Section 30 at one end is bent perpendicularly in one direction forming a right angular flange 34 formed with a central opening 36 and with a downwardly extending end flange 38 extending the length of the flange 34 on one side thereof, and with a similar shaped flange 40 on the other side, the flange 40 being slightly shorter than the length of the adjacent side. The other end of the body section 30 is turned upon itself forming an inwardly extending hook 42 slightly offset from the plane of the section 30.

The other body section 32 which forms a continuation of the section 30 is formed at its bottom end, as viewed in FIG. 1 with an enlargement or head 44 extending laterally of one side thereof. A circular opening 46 is formed at the bottom of the body proper, and a similar circular hole 48 is formed in one end of the head 44 laterally and slightly below the hole 46 as best seen in FIG. 5. At its other end, the material of the head 44 is bent perpendicularly to the plane of the head, forming a flange or lug 50. At its other top end, the body section 32 is turned upon itself in the same direction as the flange 50, forming inwardly extending hook 52, slightly offset from the plane of the body section 32. In assembling the locking device, the hooks 42 and 52 are interlocked with each other as best seen in FIG. 4. A slidable slit sleeve 54 of sheet metal is sleeved over the joint formed by the interlocked hooks 42 and 52.

The dimensions of the locking device 26 are such that it can readily be attached to and interlocked with the lower handles 20 and 22 of the door 12 and window 14, respectively, and the upper handle 24 of the pivotal window 16.

In use, the holes 46 and 48 in the enlarged head portion 44 of the section 32 of the body are slipped over the free ends of the handles 20 and 22 of the door 12 and window 14, respectively, and the opening 36 in the body section 30 is then slipped over the upstanding handle 24 of the window 16, by means of a little adjustment of the joint formed by the hooks 42 and 52.

When the locking device 26 is in operative position as shown in FIG. 1, the lug 50 prevents turning of the handle on the outside of the door 12 and consequently prevents turning of the handle 20 on the inside so that the door cannot be opened to reach the handle 22 of the window 14 or the handle 24 of the window 16 for opening such windows.

It will be understood that the positions of the openings 46 and 48 in section 32 are merely for illustration purposes and such openings are optional as to size and position and may be modified in order to accommodate the many and various positions of the placement of such handles by the manufacturers of different models of automobiles.

In FIGS. 6 to 8, inclusive, there is shown a modified form of joint connection between the sections 30' and 32' of the body of the locking device which differs from the joint shown in the form of locking device shown in FIG. 1 in that instead of interlocking the hooks 42' and 52' on the adjacent ends of the sections 30' and 32', said hooks are left free and disposed on the same sides of the sections 30' and 32' with the sections shown in end to end engagement. The sections are tied together by means of a split metal sleeve 60 slid laterally, in the direction of arrow 62 in FIG. 6, over the hooks 42' and 52', the length of said hooks, to the positions shown in FIGS. 7 and 8. When the split sleeve 60 is in this position, the split sleeve 54' is slid downwardly and lengthwise of the sections, over the sections 30' and 32' to a position over the sleeve 60 and over the hooks 42' and 52', thereby holding the sleeve 60 on the hooks 42' and 52'. The dimensions of the sleeve 54' are such so as to permit this operation.

In FIG. 9, a modified form of locking device 26" is shown which differs from the locking device 26 of FIG. 1 in that an additional lug 66 is outstruck from the material of the head 44" and spaced from the lug 50" so that the handle 20" of the door of the vehicle is adapted to be positioned between said lugs to provide an additional safeguard against unauthorized turning of the handle.

In all other respects, the locking device 26" is similar to locking device 26 of FIG. 1 and similar reference numerals are used to indicate similar elements.

Another modified form of locking device 26'" for use with a pivotal window 16'" provided with a revolving type of operating handle 24'" such as shown in FIG. 1 for the window 14 is shown in FIG. 9A. The locking device 26'" is similar to locking device 26 except that the flange 34 with opening 36, is omitted and in place thereof a hole 36'" is formed in the free end of section 30'", which hole is adapted to be inserted over the knob of the revolving handle 24'".

In all other respects, locking device 26'" is similar to locking device 26 and similar reference numerals are used to indicate similar parts.

Referring now to the modification of the invention shown in FIGS. 10 to 13, inclusive, the locking device 26a shown herein has a sectional tubular body 28a, square in cross-section, but may be round if desired. The body is composed of an outer tubular section 30a and an inner tubular section 32a, the sections being telescoped. The outer section 30a is formed with a series of spaced holes 70 on opposite side walls 72 thereof, the holes being in horizontal alignment. The outer section 30a is dimensioned so as to slide over the inner section 32a.

Inner section 32a is formed with a pair of opposed holes 74 adapted to align with the holes 70 in section 30a. The sections 30a and 32a are adapted to be held in adjusted moved position by means of a latching device 76 composed of a pair of inverted U-shaped frames 78 in opposed relation with their open ends facing each other. A compression spring 80 is interposed between the bight portions of the frames with one end seating on the bight portion of one frame and the other end impinging against the bight portion of the other frame so as to urge the frames apart. A pin 82 extends outwardly from the bight portion of each frame. The latching device 76 is mounted inside the inner section 32a with the pins 82 protruding outwardly through the holes formed therein adjacent the top thereof as seen in FIGS. 10 and 11. When the sections are in operative telescopic condition as shown in FIGS. 10 and 11, the pins 82 are also protruding through the opposed holes 70 in section 30a, outwardly thereof as shown in FIG. 11, thereby holding the sections 30a and 32a in moved adjusted position.

At one end, its top end as viewed in FIG. 10, section 30a is formed with opposed slots 86 intersecting the top end edge thereof. A latching plate 34a is supported on the top end of the tubular section 30a by means of a flange 88 extending downwardly from one side thereof, projecting into the slots 86 and secured to the top end of the section by rivets 90. Along an adjacent side of the plate 34a, a downwardly extending flange 38a is formed and on the opposite side a downwardly extending flange 40a is formed, flange 40a extending only part way along the side of the plate. A hole 36a is formed in the center of the plate 34a. The plate 34a extends perpendicularly to the sections 30a and 32a.

The bottom end of section 32a, as viewed in FIG. 10, is also formed with opposed slots 94 intersecting said bottom end edge thereof. A pair of latching plates 96 and 98 is secured to said bottom end of section 32a. Both plates are substantially rectangular in shape with one end overlapping and slidable on each other. Plate 96 is formed with a short flange 100 along its top edge seated in the slots 94 and secured to the end of the section 32a by rivets 102. Plate 96 is formed with a pair of spaced parallel closed slots 104 to receive threaded pins 106 protruding from the plate 98 whereby the plates are relatively slidable, being held in moved adjusted position by washers 108 and wing nuts 110 on the protruding ends of the pins 106. Plate 96 is formed with a large circular opening 46a at one end centrally thereof and with an integral lug 50a extending perpendicularly to the plane of the body of the plate, cut from one end thereof. The uncovered end of plate 98 is rounded, and the body of the plate is formed with a large circular opening 48a.

In using the locking device 26a, the plates 96 and 98 are placed around the handles 20 and 22 and the plate 34a placed over handle 24 by adjusting the length of the body 28a. The locking device 26a is shown on a larger scale than the scale of locking device 26, but the dimensions of the locking device 26a are such that the spacing between the openings 46a and 48a and between 46a and 36a equal the spacing between the handles so that the locking device 26a will fit over such handles.

In FIGS. 14 and 15, still another modified form of connection or joint 76x between the outer tubular section 30x and inner tubular section 32x is shown. This form of connection includes a solid block like bearing member 90 having a rectangular shaped body with a flange 92 protruding therearound, at one side thereof. The body of the block has a passage 94 extending through the center of the body lengthwise thereof. A compression spring 96 is housed in the passage 94 with the ends thereof impinging against flanges 98 on one end of pins 100, the pins extending through holes 74x in the inner tubular section 32x and through aligned holes 70x in the outer tubular section 30x. The block-like body fits inside the inner tubular section 32x, and the block is secured to the top edge of said inner tubular section by welding as indicated at 102.

When the spring 96 is expanded, the pins 100 releasably connect the tubular sections 30x and 32x. In order to release the connection, the pins 100 are manually pushed inwardly, against the action of spring 96, far enough to clear outer tubular section 32x.

What is claimed is:

1. A device of the kind described comprising an elongated metal sectional body, one section at one end thereof carrying means for interlocking said one section with the handle that manipulates the pivotal air ventilating window of an automobile, the other section carrying means for interlocking said other section with the handle that manipulates the door from the inside of the automobile and for interlocking said other section with the handle on the inside of the automobile that manipulates the sliding window on the door, the means for interlocking said one section with the handle that manipulates the pivotal air ventilating window including an integral plate on said one end extending perpendicularly to the plane of said one section, said integral plate having a central opening therein for insertion over the said handle.

2. A device of the kind described in claim 1 wherein the means for interlocking said other section with the handle that manipulates the door and for interlocking said other section with the handle for sliding the window comprises an enlargement on one end of said other section, said enlargement extending laterally of the body of said other sections, said enlargement having an opening at its outer end at its inner end for insertion over the door handle and for insertion over the sliding window handle, and a radial lug extending perpendicularly to the other section adjacent the opening for the door handle.

3. A device of the kind described in claim 1 wherein the means for interlocking said other section with the handle that manipulates the door and for interlocking said other section with the handle for sliding the window comprises an enlargement on one end of said other section, said enlargement extending laterally of the body of said other section, said enlargement having an opening at one end for insertion over the door handle and having an opening at its other end for insertion over the handle for the sliding window.

4. A device of the kind described in claim 3 wherein the sections are disposed end to end and wherein means is provided for hooking said ends in interlocking relation and wherein means is provided for holding said hooked ends against separation, said hooking means including hooked portions on the adjacent ends of the sections formed by in-turning the said ends, said in-turned ends being interlocked with each other, and a split sleeve sleeved over the sections and positioned over the hooked portions of the sections.

5. A device of the kind described in claim 4 wherein a split sleeve is positioned over the hooked ends of the sections with the edges of the split in said sleeve interlocked with the hooked end edges of the sections.

6. A device of the kind described in claim 2, wherein a second radial lug is spaced from the first-named lug providing a space therebetween for receiving the door handle.

7. A device of the kind described in claim 1 wherein the sections are tubular and in telescopic relationship, and wherein the means for interlocking the one section with the handle that manipulates the pivotal window includes a plate projecting laterally from the top end of said one section, said plate having a central opening for insertion over the said handle, the means on the other section for interlocking with the door handle and with the sliding window handle including a pair of rectangular plates, one end being overlapped and slidable over each other, one end of one of said plates being riveted to the bottom end of said other section, a pin and slot connection for slidably connecting said plates, said one plate having a circular opening at said one end for insertion over the handle for the door, a lug extending perpendicularly to the plane of said one plate adapted to engage the door handle to prevent turning thereof, said other plate having a circular opening at its other end for insertion over the handle for the sliding window.

8. A device of the kind described in claim 7 wherein one tubular section is formed with a series of opposed holes, the other section being provided with a pair of opposed holes adapted to align with the holes in the said one tubular section, means for adjustably holding the tubular sections in moved adjusted position, said means including a pair of inverted U-shaped frames supporting a compression spring therebetween whereby the frames are urged away from each other, said frames being disposed in the inner tubular section, pins projecting from the bight portions of said frames through aligned holes in the inner tubular section and in the outer tubular section, said pins normally projecting outwardly of the outer tubular section whereby the pins may be manually moved inwardly against the action of the spring to a position inwardly of the inner tubular section to break the connection between the tubular sections.

9. A device of the kind described in claim 7 wherein one tubular section is formed with a series of opposed holes, the other section being provided with a pair of opposed holes adapted to align with the holes in the said one tubular section, means for adjustably holding the tubular sections in moved adjusted position, said means including a solid square-shaped block having a flange protruding around one side thereof, said block having a passage centrally therethrough, said flange being fixedly secured to the top edge of the inner tubular section, a compression spring in said passage, flanged pins disposed with their flanges in the passage and with their bodies projecting through aligned openings in the inner and outer tubular sections, the pins protruding outwardly of the outer section, said spring normally urging said pins outwardly, said pins adapted to be manually pushed inwardly of the outer tubular section for releasing the connection between the outer and inner tubular sections.

10. A device of the kind described in claim 1 wherein the means for interlocking said one section with the handle that manipulates the pivotal air ventilating window comprises a hole in the free end of said one end for insertion over said handle.

References Cited

UNITED STATES PATENTS

| | | | |
|---|---|---|---|
| 150,096 | 4/1874 | Stafford | 24—22 |
| 1,611,694 | 12/1926 | Stumpf | 24—23 |
| 1,782,465 | 11/1930 | Frost | 24—20 |
| 2,331,150 | 10/1943 | Whiting | 292—288 X |
| 2,537,380 | 1/1951 | Travis | 292—288 |
| 2,793,064 | 5/1957 | Budoff | 292—288 |
| 2,873,769 | 2/1959 | Turteltaub | 292—288 |

MARVIN A. CHAMPION, *Primary Examiner.*

E. J. McCARTHY, *Assistant Examiner.*